Figure 1:
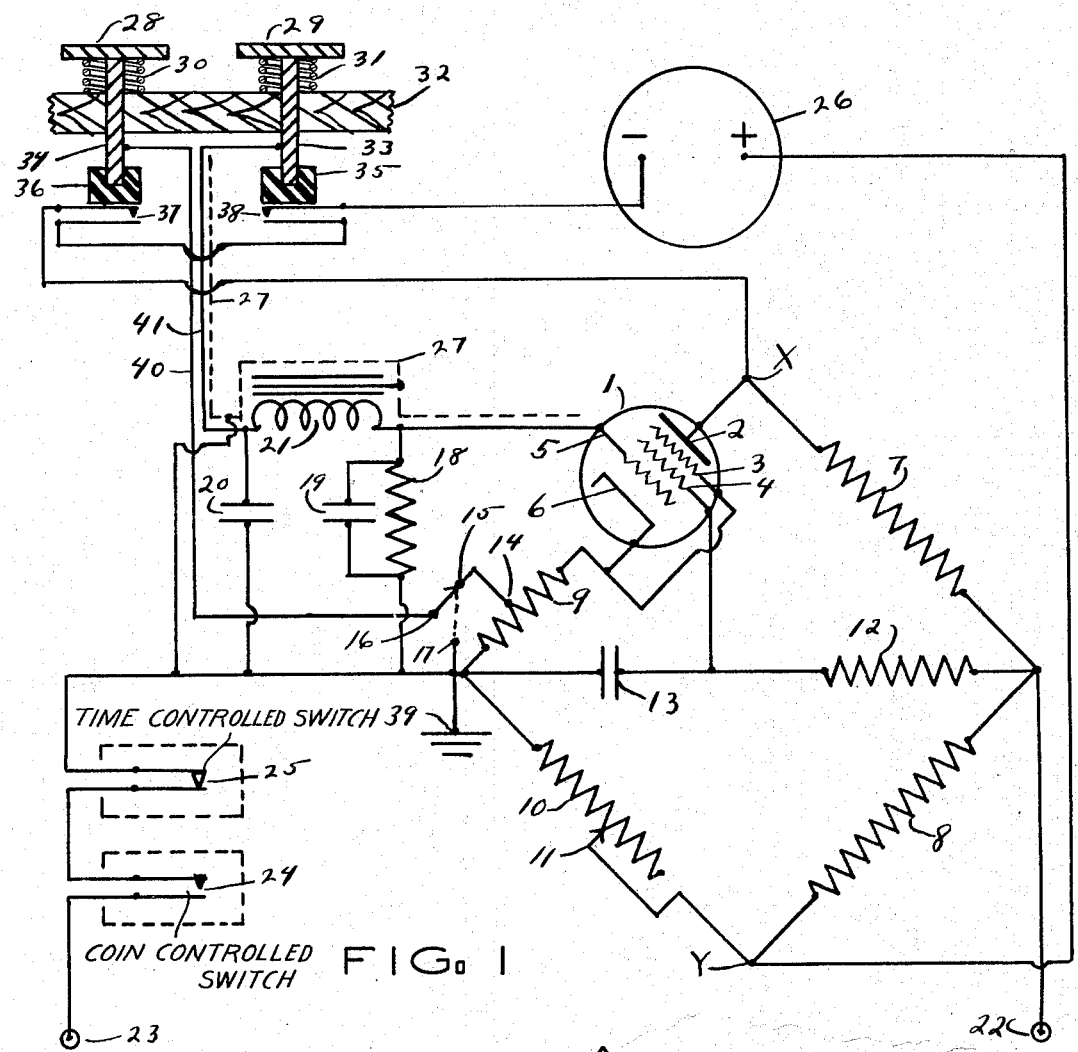

July 10, 1945.   S. D. EILENBERGER   2,379,955
AMUSEMENT DEVICE FOR REGISTERING EMOTIONS
Filed Sept. 21, 1943

Stanley D. Eilenberger
INVENTOR
BY Munn, Liddy & Glaccum
ATTORNEYS

Patented July 10, 1945

2,379,955

UNITED STATES PATENT OFFICE 2,379,955

AMUSEMENT DEVICE FOR REGISTERING EMOTION

Stanley D. Eilenberger, Kenosha, Wis., assignor to Wolgen Company, Chicago, Ill., a corporation of Illinois Application September 21, 1943, Serial No. 503,303

4 Claims. (Cl. 128—2.1)

This invention relates to an amusement device for registering the instantaneous emotional state of a player. The operation is based on two very well known biological facts: First, that a voltage differential exists between any two parts of the human anatomy and that under certain circumstances the amplitude of this voltage may be used as an indication of emotional state and, second, the ohmic resistance between any two parts of the human anatomy also varies in accordance with the emotional state.

Referring to part first above, two of the voltages most commonly used for diagnostic purposes are the cardiac voltage, as recorded on the electrocardiograph, and the brain voltage, as recorded on the electroencephalograph, both of these voltages having a wave form which may be described as pulsating direct current.

For the purposes of this invention, the direct current potential existing between the palms of the hand, or between two points on the palm of one hand, may be used as an indication of emotional state of the player. That such a voltage exists between the palms of the hands, or between two points on the palm of one hand, is well known and may be readily confirmed with my sensitive direct current galvanometer. It is not known definitely to what extent this voltage fluctuates with emotional state in a human subject, but numerous measurements confirm that such a relationship does exist, the measured voltage being extremely low during sleep, giving rise to a current of the order of .025 microampere, as measured on a sensitive undamped galvanometer, rising to values as high as 3 microamperes in a subject fully alert or emotionally tense, with values on the order of .05 microampere to .25 microampere in a fully awake but emotionally relaxed subject.

In addition to the discussion of potential difference immediately above, the ohmic resistance also varies inversely as the voltage, this resistance being on the order of several megohms during sleep and falling to a value as low as 10,000 ohms in an emotionally tense subject. It is not definitely known to what extent the instantaneous voltage is related to the instantaneous ohmic resistance but, at least in a general way, such relationship does exist, as confirmed by numerous measurements.

It is not the purpose of the present invention to register the voltage and/or ohmic resistance of a subject or player as a truely scientific measure of emotional state, but rather to register these values for amusement purposes only, but to so arrange a device that such registration is at least in part on a scientific basis. Numerous devices referred to as "fortune-tellers," "love meters," and "kiss meters" are now on the market, but such devices all work on the law of probability, giving the player a printed answer, the selection of said answer being purely on a law of probability basis. The present invention proposes to give the player a suitable answer on registration means provided, where such answer is at least in part based on physical information obtained from the player.

The objects of this invention are:

First, in an amusement device, to provide a method of registering the degree of emotional tenseness or, inversely, emotional relaxation by means of recording the electrical potential difference between two parts of the player's anatomy.

Second, in an amusement device, to provide a method of registering the degree of emotional tenseness or, inversely, emotional relaxation by recording instantaneous ohmic resistance and the instantaneous electric potential between two parts of the player's anatomy.

Third, in an amusement device, to provide a method of registering the degree of emotional tenseness or, inversely, emotional relaxation of a player by recording both the electric potential and ohmic resistance existing between two parts of the player's anatomy.

From the foregoing description, it may seem to be a relatively simple matter to record the electric potential existing between the palms of a player, or between two points on the palm of a player, or to record the ohmic resistance between such points. This is not the case, as numerous difficulties are encountered in attempting to accurately record either of these two values and these difficulties have been overcome by the present invention.

In recording the electric potential, it is not practical to use a sensitive galvanometer, as such a device would not stand the abuse to which any amusement device in a public place is subject, such sensitive galvanometer being subject to damage by even slight mechanical shock. Furthermore, voltage or current recording instruments with sufficient sensitivity for direct connection to a human subject are too sensitive for use in an amusement device, as it is necessary to allow the deflecting mechanism to come to rest in order to get a reading, and furthermore, such a sensitive recording instrument, even if highly damped, will accurately follow any small voltage or current changes, so that it is impossible for an average player, unskilled in reading electrical meters, to obtain any satisfactory steady state reading on such a sensitive instrument. Therefore, it is apparent that the electric potential difference existing in the player must be amplified sufficiently that a relatively stable electrical indicating means may be used, such as, for example, a milliammeter. The present invention provides methods and means for smoothing out small changes in potential so that a steady average reading is obtained.

A further difficulty encountered is that when the player voltage is amplified sufficiently to actuate a milliammeter, there is a tendency to pick up and amplify a considerable amount of stray field, from 60 cycle electric light wiring, electric motors, and other apparatus. This stray field strength varies with location but is almost always present, especially in any location such as an amusement arcade, where numerous electrical appliances are in use, and very often the strength of such stray fields may exceed the player potential which is to be measured. That this is so may be easily verified by placing the hands on the input terminals of a sensitive vacuum tube voltmeter; a reading varying from a few tenths of one volt to several volts will be obtained, this reading being dependent on the stray field strengths and not on the body potential of the subject.

A further consideration is that the actual direct current potential existing between the palms of a player may at any given instant be of either polarity and such polarity may instantaneously change. The reason for this is not definitely known but it is obvious that for purposes of an amusement device it is necessary to have a voltage reading in one direction only.

From the foregoing, it is apparent that in order to register the electric potential existing between the palms of a player it is necessary to, first, amplify the voltage sufficiently to actuate an electric indicating mechanism which is mechanically reliable and not subject to vibration. Second, it is necessary to provide means so that an average reading is obtained which does not consistently fluctuate between peaks and valleys of the true voltage, where said average value is the true resultant of such voltage peaks and valleys. Third, it is necessary to provide means for eliminating all stray field pickup, from 60 cycle light lines. etc., without affecting the voltage it is desired to record. Fourth, it is necessary to provide means so that the voltage reading is always in the same direction, to prevent a reverse reading on the registering means.

Where the ohmic resistance is recorded, difficulties are also encountered. If subject resistance is measured by means of an ohmmeter such as is commonly used in laboratory measurement, the reading is falsely low, due to the fact that the current passed by the ohmmeter circuit is sufficiently large to stimulate nerve and/or muscle action potential, which in themselves provide a voltage surge which is added to the voltage flowing in the ohmmeter circuit. This difficulty might be overcome by using a very sensitive recording instrument, but such a sensitive instrument would not be satisfactory in an amusement device, for the same reasons mentioned above. The present invention discloses means of measuring the ohmic resistance of the player by passing a very minute current, on the order of several microamperes, and amplifying the resultant to obtain a reading on an indicating mechanism which is mechanically stable. When amplifying this small voltage change it is necessary to observe all of the same precautions as noted above in regard to amplifying the electric potential difference of the player.

In the preferred form, this invention measures both the ohmic resistance and the electric potential of the player, in such a manner that these values co-operate to produce a final reading on the registering means provided. This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 represents schematically an electronic circuit which may be used in the practice of this invention.

Figure 2:
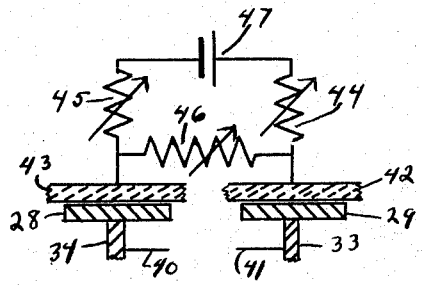

Figure 2 schematically represents the player's equivalent circuit.

Figure 3:
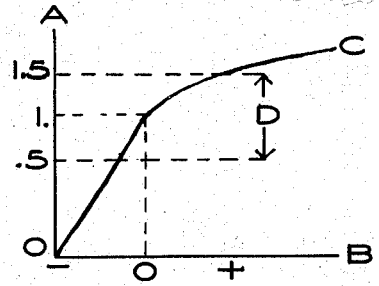

Figure 3 graphically represents a desirable grid voltage-plate current relationship for the vacuum tube in the schematic circuit of Figure 1.

Referring more particularly to Figure 1, vacuum tube 1 is a high gain pentode representing part of one arm in a bridge circuit, it being understood that 1 may also represent other vacuum tube forms, such as a triode, and also that vacuum tube 1 may represent an amplifier having more than one stage. I have found that a single high gain pentode used in the schematic circuit of Figure 1 provides sufficient voltage gain for the intended purpose, but two or more tubes may be used in a cascade amplifier without departing from the principles disclosed by this invention.

Resistors 7 and 8 are of like value and form two arms of the bridge; a third arm is formed by the resistance between plate 2 and cathode 6 of vacuum tube 1, in series with cathode resistor 9. The fourth arm is formed by variable resistor 10, having a slider 11, resistor 10 and slider 11 being used to balance the bridge.

Suppressor grid 3 of vacuum tube 1 is normally connected to cathode 6, while screen grid 4 is energized through resistor 12 which is bypassed through condenser 13. To the terminal 22 is connected the plus terminal of a source of high voltage, preferably regulated by means of a gas discharge tube or otherwise. Indicating meter 26 is connected between the balanced points X and Y of the bridge, in series with normally open contacts 37 and 38. The negative terminal of the high voltage source is connected to terminal 23, which is connected to common ground 39 in series with normally open contacts 24, which in an amusement device may well represent a coin operated switch, and normally closed contacts 25, which in an amusement device may well represent a time switch so arranged to reopen contacts 24 at a pre-determined time after contacts 24 have been closed by inserting a coin, it being understood that other arrangements may be used in lieu of coin controlled switch 24 and time controlled switch 25; the arrangement shown being merely representative of those arrangements commonly used in coin operated devices.

Control grid 5 of vacuum tube 1 is connected to an external electrode 29, in series with choke coil 21, shielded lead 41 and shaft 33. Choke coil 21 is of the iron core type having a relatively high inductance value, and this choke coil cooperates with condensers 20 and 19 to form a low-pass filter which offers only ohmic resistance to the passage of direct current voltage, while effectively by-passing all alternating voltage, even where the frequency is on the order of 30 cycles per second. In order to be effective in smoothing out such low frequency, condenser 20 must be of relatively high capacity, preferably of the paper insulated type, having a very low leakage factor. Electrolytic condensers have not been found satisfactory for this purpose, as in effect they provide additional shunt resistance between control grid 5 and common ground 39. Condenser 19 may well be a relatively high capacity mica condenser, which contributes little to filtering low frequency alternating current but effectively by-passes high frequency surges which may be picked up by electrode 29 as a result of opening or closing electric switches in the near vicinity, arcing motor brushes, etc. The shielding of the lead 41, the filter choke 21 and its connecting lead to control grid 5 by the shield 27 prevents these parts from responding to stray fields, and limits the stray field pickup to the electrode 29. The reduction in stray field pickup to the electrode 29, in combination with the filter for by-passing both low and high frequencies, renders the vacuum tube unresponsive to power line surges and to induction at the power line frequency. Resistor 18 acts to normally provide control grid 5 with a bias voltage negative in respect to cathode 6, resistor 18 normally being of relatively high ohmic value, approximating 1 megohm. Cathode resistor 9 is sufficiently high in value so that vacuum tube 1 is operated near plate current cut-off, and under static conditions, with no input voltage to control grid 5, the bridge is balanced by adjusting slide arm 11 of resistor 10 to a value where no current flows between points X and Y of the bridge, at which time indicating meter 26 will register 0, assuming that series contacts 37 and 38 have been closed for purposes of making this adjustment.

Electrodes 28 and 29 are formed of any similar metal. For example, both electrodes 28 and 29 may be circular disks formed of aluminum or any other metal, the only requirement being that both electrodes be of the same kind of metal, it being understood that any desired shape may be given to electrodes 28 and 29; for example, they may be spherical, flat, elliptical, half-round, or any other desired shape, this factor being a function of choice rather than necessity. It is also understood that electrodes 28 and 29, while preferably designed to be contacted by both palms of the player, may be arranged in any convenient manner adjacent to each other so that only one palm of the player rests on both electrodes. The results of either method are the same, except that the actual reading obtained by using both palms is usually somewhat higher than the reading obtained between any two points on the same palm. These electrodes may also be arranged to come in contact with other portions of the anatomy besides the palms. For example, a very satisfactory reading may be obtained between either palm and the forehead. It is believed that the palms offer the most satisfactory points of contact for use in an amusement device, although other points of contact may be used.

Electrode 28 is connected to shaft 34 in any convenient manner, insulating bushing 36 being arranged to close contact 37 when electrode 28 is depressed by the player, coil spring 30 acting to hold electrode 28 in the non-operated position until depressed by the player. Connection is made to shaft 34 and electrode 28 by lead 40, which in turn is connected to switch arm 16, which may be in contact with either switch point 15 or switch point 17, as desired.

With switch arm 16 contacting point 15, as shown by Figure 1, contact is established with tap 14 on cathode resistor 9. This places a small voltage in series with electrode 28, the player electrode 29 and choke coil 21, so that a less negative potential is placed on control grid 5, the value of such potential being dependent on the ohmic resistance of the player. Tap 14 is so chosen that the maximum current flowing through this series circuit is relatively small, on the order of a few microamperes, below the threshold value where nerve stimulation would occur, which does occur with an ordinary ohmmeter, where current values between several hundred and several thousand microamperes are used. Furthermore, the polarized potential present on electrode 28 acts to polarize the electric potential difference normally present in the player, so that the total operating voltage present on control grid 5 is always less negative than the static voltage control grid 5. The effect of this is that the normal negative grid bias of control grid 5 is made less negative, with a resultant rise in plate current, this rise in plate current increasing the voltage drop across resistor 7, thereby unbalancing the bridge and permitting a current to flow through indicating meter 26, the value of this current being dependent both on the electric potential difference of the player and the ohmic resistance of the player.

The structure of electrode 29 is similar to that of electrode 28 previously described, except that connecting lead 41 is shielded by grounded shield 27, the entire arrangement being such that both electrodes must be depressed by the player in order to establish the circuit for indicating meter 26. While contacts 37 and 38 are not absolutely essential to the operation of the device, and may be omitted, the use of such contacts, co-operating with springs 30 and 31 insures that firm contact is made between the player and the electrodes, firm contact being necessary in order to provide a true reading. The entire electrode assembly is mounted on a suitable surface 32 available to the player.

If switch arm 16 is moved to contact point 17, electrode 28 is connected directly to common ground terminal 39 so that now the device functions purely as an electronic voltmeter and the reading obtained on indicating meter 26 is strictly a function of electric potential difference existing between the points of contact of the player with electrodes 28 and 29.

The preferred method of operation is with switch arm 16 contacting point 15, and this connection may be made permanent if desired, or, if desired, the switch arrangement consisting of lever 16 and contact points 15 and 17 may be included as part of the device, preferably mounted at some point not available to the player.

The bridge balance adjustment comprising slide arm 11 and resistor 10 is so mounted as to not be available to the player, this adjustment being permanent or semi-permanent. While it is normally intended that the bridge will be balanced so that meter 26 reads true zero current, the arrangement as shown by Figure 1 is such that a slight amount of unbalance will not be noticeable to the player, although it will create an error in the final reading obtained on indicating meter 26. This is so because no reading will be obtained on indicating meter 26 until contacts 37 and 38 are closed, at which time a less negative grid voltage is supplied to control grid 5 and a reading is obtained, such reading being accurate only if the bridge is in perfect balance, the reading being high or low by the same amount that the bridge may be unbalanced.

Indicating meter 26, as previously mentioned, comprises a milliammeter, the movement of which may be a standard commercial meter in all respects. For amusement device purposes it is desirable that the reading be obtained on a large dial and this may be accomplished by any desired means. For example, a large dial may be used with the meter pointer having sufficient counterbalanced extension to appropriately fit the dial scale or preferably, the meter movement may be so mounted in front of a source of illumination that a shadow or an illuminated spot is projected on a translucent dial, such arrangements being commonly used for other purposes. The actual dial scale may be either circular, semi-circular or rectangular in the so-called slide rule manner, preferably illuminated, and while numerals such as 0-100 may be used on such a scale, it is preferable, for amusement device purposes, to also include suitable wording at various points on the scale, such wording being so chosen as to indicate a low degree of emotional tension at low scale readings and a high degree of emotional tension at high scale readings.

In addition to acting as an alternating current filter, choke coil 21, condenser 20 and condenser 19 also smooth out any instantaneous voltage changes which normally occur in the average human subject. The effect of this is that indicating meter 26 gives a final reading which is the equivalent of average voltage present at the input to choke 21. The overall effect is equivalent to a highly damped indicating meter where the damping is mechanical, except that in the present instance the damping is electrical, the degree of damping being largely determined by the capacity of condenser 20 and the inductance of choke coil 21.

All of the circuit values must be so chosen that satisfactory readings are obtained on indicating meter 26, and when properly chosen a readable deflection will be given for the lowest voltage and highest resistance values encountered, and for the highest voltage and lowest resistance encountered the deflection should not exceed full scale. For reasons of clarity it is desirable to use a linear scale arrangement, so that due to the wide range of values encountered it becomes necessary to provide a logarithmic or semi-logarithmic circuit arrangement as further explained in more detail in connection with Figure 3.

Referring now to Figure 2, the equivalent circuit of the player is given, where 43 and 42 represent the palms of the player, or such other parts of the player that come in contact with electrodes 28 and 29. The source of voltage is represented by 47 and such voltage source may instantaneously be of either polarity. Resistors 44 and 45 represent the resistance between the points of contact with the electrodes and the source of potential; to a large extent, resistors 44 and 45 represent the skin resistance taken directly through the skin, this resistance being variable, as previously explained. In addition to the series resistance present, a shunt resistance represented by 46 exists between the electrodes. This resistance may be considered as the surface resistivity between electrodes.

While it is understood that it is impossible to accurately represent such conditions schematically, Figure 2 represents an equivalent circuit which is in agreement with existing biological knowledge, the actual source of voltage being unknown, but presumed to be chemical in nature. Referring now to Figure 3, which represents the preferred condition for operation of vacuum tube 1, where ordinate A represents plate current, abscissa B represents grid voltage and curve C represents the change in plate current with changing grid voltage, the space D between broken lines representing the desirable operating range. Such a condition may be obtained by proper choice of resistance and voltage values, especially resistor 7 which acts as a plate series resistor and resistor 9 which acts as a cathode resistor. With proper choice of such values, the grid voltage on control grid 5 is always negative for static conditions with no input voltage from electrodes 28 and 29 and maximum change in plate current is obtained for low values of grid voltage change in the positive direction. As this grid voltage change increases, the plate current change becomes less, so that maximum reading per unit input is obtained for low values of grid voltage change and curve C becomes sufficiently flat for higher values of grid voltage that maximum scale reading will not be exceeded.

I have described an amusement device which may be used to record the electric potential difference existing between two parts of the anatomy of a player or the ohmic resistance which may exist between such parts. The device, as disclosed, is not responsive to stray field effects of alternating current or high frequency current. The reading obtained is, at least to a degree, related to the instantaneous emotional state of the player, therefore providing an amusement device which is at least in part a scientific instrument. The final reading obtained is free from any influence except the voltage difference and resistance of the player and, by use of a suitable filter circuit, average values are read as a steady state reading, such values not being affected by small voltage fluctuations, and by use of a suitable polarizing current the meter readings obtained are always of the same polarity, the use of such a polarizing current preventing opposite polarity readings.

To summarize briefly the operation of the preferred form of my invention herein described in detail, a pentode vacuum tube 1 and its associated cathode bias resistor form one arm of a Wheatstone bridge, the other three arms of which are formed by fixed resistors 7 and 8, and an adjustable resistor 10, by which the bridge may be balanced. The positive terminal of a high voltage plate supply is connected to terminal 22, which in turn is connected to the junction of resistors 7 and 8. The negative terminal of the supply is connected to terminal 23, which is connected to the grounded junction of resistors 9 and 10 through the coin controlled switch 25. Resistor 12 supplies voltage to the pentode screen, which is by-passed by condenser 13. A meter or other indicating instrument 26 is connected across the conjugate points X and Y of the bridge through the normally open switches 37 and 38. An electrode 28 is connected to switch 16, which may contact switch point 17 or switch point 15 as desired. Electrode 29 is connected to the control grid 5 of vacuum tube 1 through a filter consisting of choke coil 21 and condensers 19 and 20. The filter and the connections from the filter to electrode 29 and to control grid 5 are protected by a grounded shield 27 so as to prevent the circuit from responding to stray fields such as power lines, induction and surges due to arcing commutators, switches, et cetera. Such stray fields as are picked up by the electrode 29 will be by-passed to the ground by the filter and thus be prevented from affecting control grid 5. The design of the filter is such that it will by-pass all alternating components of 30 cycles per second or more, and it serves not only to by-pass stray field pickups but also by-passes rapid fluctuations in the current in the electrode circuit due to changes in the electrical resistance or voltages of the player's anatomy.

To operate the device, the player inserts a coin which closes switch 24 and energizes the bridge. The player then presses his palms against the electrodes 28 and 39 until the meter 26 gives an indication corresponding to the electrical condition of the player. If the switch 16 rests on point 17, the grid 5 of the vacuum tube 1 will be affected by the potential developed by the player between the points of contact with the electrodes. Where the switch 16 rests on point 15, a positive voltage produced by the potential drop between tap 14 on resistor 9 and ground, is added to the potential developed by the player. In either case, the resistance of the player determines what part of the total developed potential will be applied to grid 5. Application of a positive potential to the grid increases the current flow through pentode 1 and unbalances the bridge and, if the player is exerting sufficient pressure on the spring-supported electrodes 28 and 29 to close contacts 37 and 38, the meter will indicate the electrical condition of the player. After a predetermined interval, contacts 25 will open momentarily while the coin is being collected and contacts 24 are being reopened to condition the machine for a succeeding player.

While the foregoing description serves to illustrate the manner in which the objects of my invention may be carried out, nevertheless, it is understood that I do not desire my invention to be limited thereby, but only by the scope of the following claims.

I claim:

1. The method of indicating the instantaneous emotional state of a subject normally exhibiting a potential difference varying in magnitude and polarity between spaced points on the surface of the subject, in response to variations in the emotional state of the subject, comprising applying a biasing potential difference of uniform predetermined value and polarity across spaced points on the surface of the subject, to polarize the natural potential difference between said points, filtering the resultant potential difference to exclude all pulsating and alternating potential to obtain a unidirectional potential difference varying in magnitude as a function of the natural instantaneous potential difference between said points, amplifying said resultant potential difference and electrically indicating the instantaneous emotional state of the subject as a function of the instantaneous value of said amplified potential difference.

2. A device for indicating the instantaneous emotional state of a subject exhibiting an electric potential difference between spaced points on the body of the subject, which potential difference varies in magnitude and polarity in response to variations in the emotional state of the subject, comprising an electronic amplifier including an input circuit and an output circuit, a pair of spaced external electrodes to be engaged by the body of the subject and operatively coupled to said input circuit, a source of electric potential, means connecting said source with said spaced electrodes and for superposing therebetween a potential difference of predetermined uniform magnitude and polarity, said input circuit including a low-pass filter to exclude all pulsating and alternating potential to insure a unidirectional potential bias on the input of the amplifier, the value of which is a function of the instantaneous potential difference existing between said spaced electrodes, and an electric indicating instrument operatively connected across the output circuit of the amplifier to indicate the instantaneous emotional state of the subject as a function of the potential difference between said electrodes.

3. A device for indicating the instantaneous emotional state of a subject exhibiting an electric potential difference between spaced points on the body of the subject, which potential difference varies in magnitude and polarity in response to variations in the emotional state of the subject, comprising a resistance bridge network including an electronic amplifier connected in series with a resistor across one arm of the bridge, a source of unidirectional potential connected across one pair of conjugate points of the bridge, said electronic amplifier including a cathode, an anode and an input electrode, said resistor being connected between the cathode and one of said pair of conjugate points, a pair of spaced, external electrodes to be engaged by said subject, means connecting said electrodes in series with said input electrode and a point on said resistor between the cathode and said one of said pair of conjugate points, to thereby superpose on and between said spaced electrodes a biasing potential of predetermined uniform magnitude and polarity, said series connection between the spaced electrodes and said input electrode including a low-pass filter to exclude all pulsating and alternating potential to thereby superpose on said input electrode a unidirectional bias varying in magnitude as a function of the instantaneous potential difference between said spaced electrodes, and an electrical indicating instrument connected across the other pair of conjugate points of the bridge to thereby indicate the instantaneous emotional state of the subject as a function of the amplified potential difference between said spaced electrodes.

4. The device of claim 3 wherein at least one of said external electrodes is movable in response to engagement thereof by said subject, and wherein the means connecting said electrical indicating instrument to said other pair of conjugate bridge points includes at least one normally open switch arranged to be closed by the movement of said movable electrode.

STANLEY D. EILENBERGER.